(12) United States Patent
Kawamoto

(10) Patent No.: US 8,411,318 B2
(45) Date of Patent: *Apr. 2, 2013

(54) COLOR AND MONOCHROME IMAGE PROCESSING AND OUTPUTTING APPARATUS

(75) Inventor: Hiroyuki Kawamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 694 days.

This patent is subject to a terminal disclaimer.

(21) Appl. No.: 11/565,852

(22) Filed: Dec. 1, 2006

(65) Prior Publication Data

US 2007/0127094 A1 Jun. 7, 2007

(30) Foreign Application Priority Data

Dec. 6, 2005 (JP) ................................. 2005-352107

(51) Int. Cl.
*G03F 3/08* (2006.01)
*H04N 1/40* (2006.01)

(52) U.S. Cl. .......... 358/1.9; 358/1.15; 358/2.1; 358/448

(58) Field of Classification Search .................. 358/1.9, 358/3.24, 515, 523, 538, 518, 1.15, 2.1, 448
See application file for complete search history.

(56) References Cited

U.S. PATENT DOCUMENTS

| | | | | |
|---|---|---|---|---|
| 5,786,906 | A * | 7/1998 | Shishizuka | 358/500 |
| 6,118,895 | A * | 9/2000 | Hirota et al. | 382/165 |
| 6,426,809 | B1 * | 7/2002 | Hayashi et al. | 358/529 |
| 2003/0164964 | A1 * | 9/2003 | Katsuyama | 358/1.9 |
| 2004/0105582 | A1 * | 6/2004 | Boesten et al. | 382/170 |
| 2006/0221415 | A1 * | 10/2006 | Kawamoto | 358/518 |
| 2007/0030504 | A1 * | 2/2007 | Kawamoto et al. | 358/1.9 |
| 2007/0030527 | A1 * | 2/2007 | Fuchigami | 358/448 |
| 2007/0086068 | A1 * | 4/2007 | Ohkawa et al. | 358/500 |
| 2011/0261424 | A1 * | 10/2011 | Matsuoka | 358/448 |

FOREIGN PATENT DOCUMENTS

| | | |
|---|---|---|
| JP | 6-152972 | 5/1994 |
| JP | 6-205204 | 7/1994 |
| JP | 10-326336 | 12/1998 |
| JP | 2001-285653 | 10/2001 |
| JP | 2001-358950 | 12/2001 |
| JP | 2003-153014 | 5/2003 |

* cited by examiner

*Primary Examiner* — Kimberly A Williams
(74) *Attorney, Agent, or Firm* — Oblon, Spivak, McClelland, Maier & Neustadt, L.L.P.

(57) ABSTRACT

An image processing apparatus able to instantaneously transmit image data on which a color/monochrome judgment and a series of processings have been performed comprising: a color/monochrome judging device for judging if input RGB image data is color or monochrome; a color image correction processing unit for performing color image correction processing on the RGB image data and outputting color image data; a monochrome image conversion processing unit for performing monochrome image conversion processing on the RGB image data and converting the same to monochrome image data; image accumulation device for accumulating color image data and monochrome image data; a network I/F for transmitting the image data accumulated in the image accumulation device to an external network; and accumulation control device for outputting either the color image data or monochrome image data accumulated in the image accumulation device to an external network in accordance with the color/monochrome judgment result.

16 Claims, 8 Drawing Sheets

FIG. 7

| IMAGE MODE | CHARACTER | CHARACTER/PHOTOS | PHOTO |
|---|---|---|---|
| clr_threth | 15 | 10 | 5 |
| clrcnt_threth | 300 | 200 | 100 |

COLOR AND MONOCHROME IMAGE PROCESSING AND OUTPUTTING APPARATUS

BACKGROUND OF THE INVENTION

1. Field of the Invention

The present invention relates to an image processing apparatus that processes input RGB image data and transmits it by way of a network to an external device or an imaging unit of an image forming apparatus, and to an image forming apparatus such as a copier, facsimile, printer or digital copier with these functions comprising this image processing apparatus.

2. Description of the Related Art

As described in Japanese Unexamined Patent Applications Nos. 2001-285653 (Prior Art 1), H06-205204 (Prior Art 2) and H10-326336 (Prior Art 3) as well as Japanese Patent No. 3330408 (Prior Art 4), this type of technology is well known. With the object of enhancing the operating efficiency of the reading of the original, Prior Art 1 thereof discloses an image processing unit comprising judging means for judging the type of original on the basis of a read image read by an original reader unit and image processing means for processing the read image on the basis of the judgment result by judging means. The original reader unit executes read processing to produce a read image compatible with the type of original of the greatest quantity of information of the plurality of types of the original established in advance, and image processing means, when the type of original pertaining to the judgment result does not match the type of original of the greatest quantity of information, converts the read image to a format compatible with the type of original pertaining to the judgment result. Or, the original reader unit executes read processing compatible with the color original, and image processing means, when the type of original pertaining to the judgment result is a type other than the color original, converts the read color image to a format compatible with the type of original pertaining to the judgment result.

In addition, with the object of, in photo mode processing of an area-designated area, automatically judging whether the area is color or monochrome and whether the picture component is a silver-salt photograph or dot photograph and, in the main scan, performing a switchover of processing such as color correction appropriate to each to reproduce the photograph within the area with good color reproducibility, Prior Art 2 discloses an image processing apparatus that reads the original as an R, G, B digital signal and, employing a color correction coefficient group established in advance by a predetermined method, converts the R, G, B signal of each pixel into a recorded signal. This image processing apparatus comprises means for designating the represented region of the original, means for detecting a predetermined characteristic quantity from the designated picture component region, means for judging whether the represented region is color or monochrome or whether it is a silver-salt photograph picture or dot photograph picture component based on this characteristic quantity, and means for selecting the color correction coefficient group in accordance with the judgment result thereof.

In addition, with the object of producing a color image, gray-scale image and monochrome image in a single read, Prior Art 3 discloses an image processing unit that reproduces color image files, gray-scale image files and monochrome image files from R, G, B data read from a predetermined unit of an original. The image processing apparatus comprises color image film production means for producing color image files from input R, G and B data, gray-scale image file producing means for producing gray-scale image files from input G data, monochrome image file producing means for producing monochrome image files from gray-scale images produced by gray-scale image producing means, an image display memory for storing each of the color image files produced by color image file producing means, the gray-scale image files produced by gray-scale image file producing means and the monochrome image files produced by monochrome image file producing means in respective predetermined storing regions, and image display means for displaying the images of each of the color image files, gray-scale image files and monochrome image files stored in the image display memory.

In addition, with the object of, in photo mode processing of an area-designated area, automatically judging whether the area is color or monochrome or whether the type of original, in particular the picture component, is a silver-salt photograph or dot photograph and, in the main scan, performing a switchover of processing such as color correction appropriate to each to reproduce the photograph within the area with good color reproducibility, Prior Art 4 discloses an image processing apparatus that reads the original as an R, G, B digital signal and, employing a color correction coefficient group established in advance by a predetermined method, converts the R, G, B signal of each pixel into a recorded signal. This image processing apparatus comprises means for designating the represented region of the original, means for detecting a predetermined characteristic quantity from the designated represented region, means for judging whether the represented region is color or monochrome or whether it is a silver-salt photograph picture or dot photograph picture component based on this characteristic quantity, and means for selecting the color correction coefficient group in accordance with the judgment result thereof.

The image processing apparatuses described above are configured to discriminate between color images and monochrome images and to perform predetermined processings in response to the type of image based on the discriminated result thereof. On the other hand, for the transmission of this image data, a configuration for image transmission based on the use of an image accumulation device for reading image data to accumulate RGB data and the implementation of color→monochrome conversion→binarization processings when the data is to be transmitted based on a color/monochrome judgment result obtained when an image is read is commonly employed.

However, there are problems associated with image transmission based on the use of an image accumulation device for reading image data to accumulate RGB data and the implementation of color→monochrome conversion→binarization processings when the data is to be transmitted based on a color/monochrome judgment result obtained when an image is read in this way in that, because image transmission is performed following image accumulation and subsequent to a complicated image processing being performed, the image processing for the transmitting of data takes time. While a simplification of the algorithm to shorten the processing time may be performed, there are inherent concerns of image quality deterioration associated therewith.

SUMMARY OF THE INVENTION

With the foregoing conditions of the prior art in mind, it is an object of the present invention to provide an image processing apparatus able to instantaneously transmit image data on which a color/monochrome judgment and a series of processings have been performed.

In accordance with an aspect of the present invention, an image processing apparatus comprises a judging device for judging if input RGB image data is color or monochrome; a color image correction processing device for performing color image correction processing on the RGB image data and outputting color image data; a monochrome image conversion processing device for performing monochrome image conversion processing on the RGB image data and converting the same to monochrome gray-scale image data; an accumulation device for accumulating the color image data and monochrome gray-scale image data; a network interface for transmitting the image data accumulated in the accumulation device to an external network; and a control device for outputting either the color image data or monochrome gray-scale image data accumulated in the accumulation device to an external network in accordance with a judgment result of the judging device.

In accordance with another aspect of the present invention, an image forming apparatus comprises an image processing apparatus which comprises a judging device judging if input RGB image data is color or monochrome; a color image correction processing device for performing color image correction processing on the RGB image data and outputting color image data; a monochrome image conversion processing device for performing monochrome image conversion processing on the RGB image data and converting the same to monochrome gray-scale image data; an accumulation device for accumulating the color image data and monochrome gray-scale image data; a network interface for transmitting the image data accumulated in the accumulation device to an external network; and a control device for outputting either the color image data or monochrome gray-scale image data accumulated in the accumulation device to an external network in accordance with a judgment result of the judging device.

BRIEF DESCRIPTION OF THE DRAWINGS

The above and other objects, features and advances of the present invention will become more apparent from the following detailed description based on the accompanying drawings in which:

FIG. 7 is a diagram showing the relationship between color judgment threshold value and image quality mode for character, character/photograph and photograph.

DESCRIPTION OF THE PREFERRED EMBODIMENTS

The embodiments of the present invention will be hereinafter described with reference to the drawings.

First Embodiment

Figure 1:
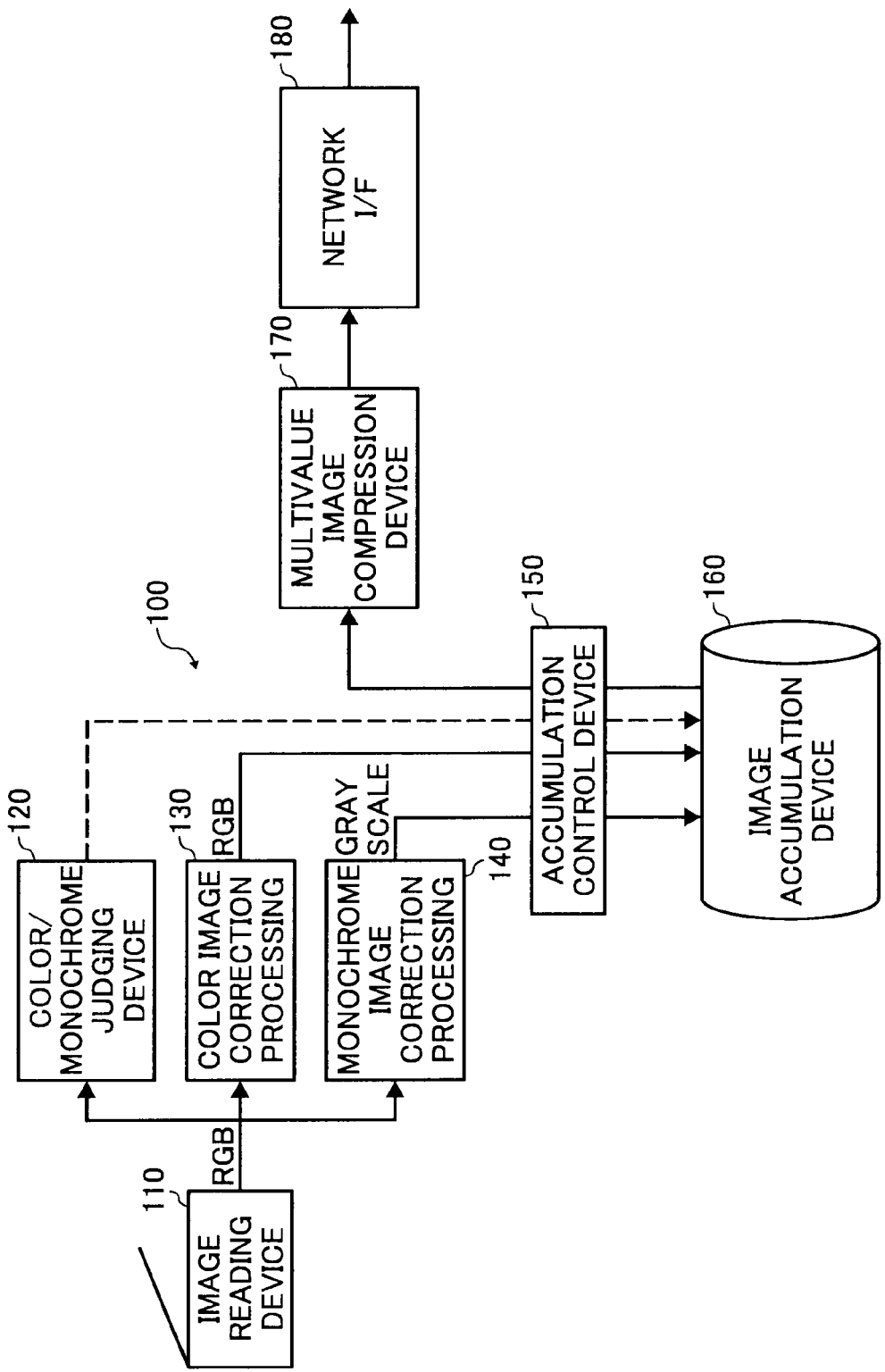
FIG. 1 is a block diagram of the configuration of an image processing apparatus pertaining to a first embodiment of the present invention.

FIG. 1 is a block diagram of the configuration of an image processing apparatus pertaining to an embodiment. An image processing apparatus 100 of the diagram is configured from an image reading device 110, color/monochrome judging device 120, color image correction processing unit 130, monochrome image correction processing unit 140, accumulation control device 150, image accumulation device 160, multivalue image compression device 170, and network I/F 180. The reading of an original involves the original being read by the image reading device 110 and data color-resolved to R, G, B being produced. The image data resolved to RGB is input into each of the color/monochrome judging device 120, color image correction processing unit 130 and monochrome image correction processing unit 140.

Figure 2:
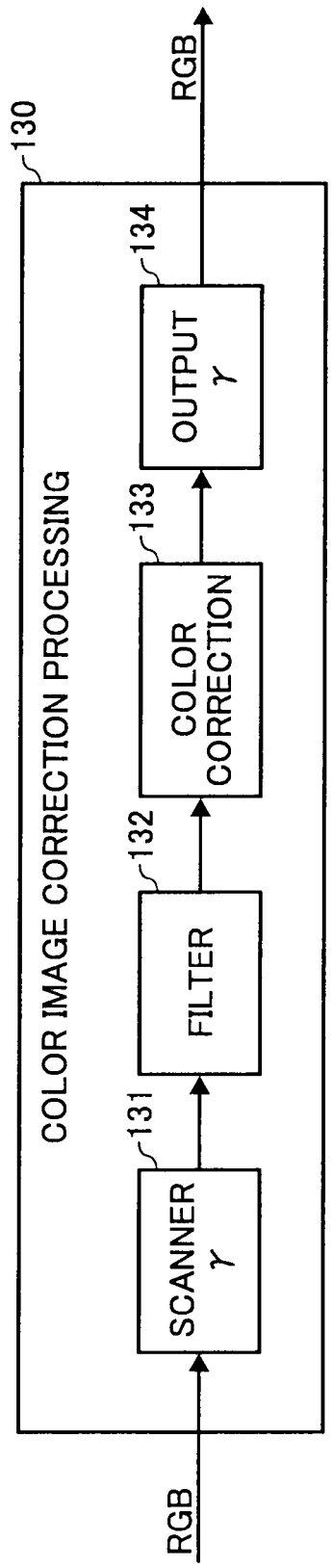
FIG. 2 is a block diagram of the configuration of a color image correction processing unit of this image processing apparatus.

As shown in FIG. 2, the color image correction processing unit 130 comprises a scanner γ processing unit 131, filter processing unit 132, color correction processing unit 133 and output γ processing unit 134, scanner γ processing being initially performed on the input image, subsequent to which filter processing, color correction processing and then output γ processing is performed thereon prior to RGB data being output to the accumulation control device 150. The read data, which is a reflectance linear data, is converted by the scanner γ processing unit 131 to a fixed γ of brightness or the like. This conversion is constituted from an input 8 bit, output 8 bit LUT. The filter processing unit 132 is a space filter of a 5×5 matrix size. The color correction processing unit 133 may perform a linear conversion based on a 3×3 matrix calculation, or it may constitute an LUT. The output γ processing unit 134 is configured from an LUT. The contents of the LUT are converted to alter the density of the read image on the basis of a user's command for altering the density of the read image.

Figure 3:
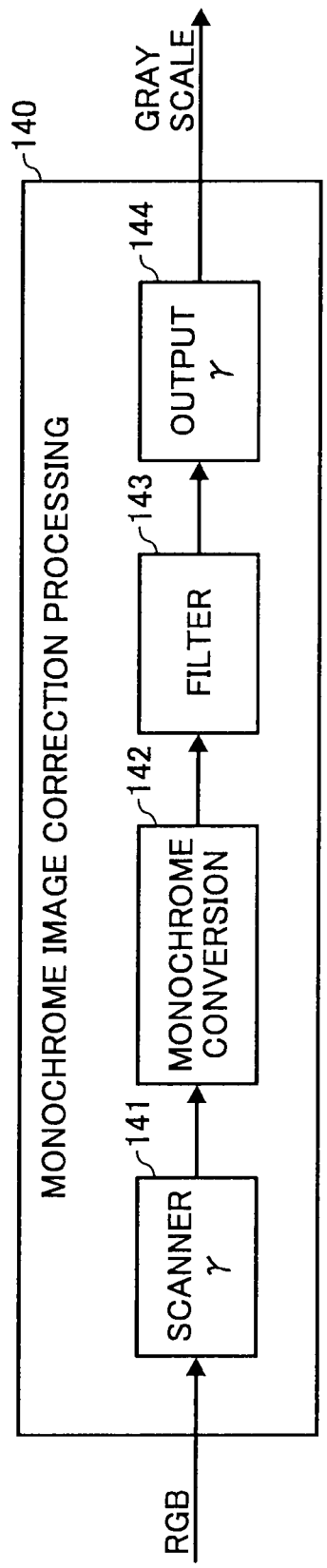
FIG. 3 is a block diagram of the configuration of a monochrome image correction processing unit of this image processing apparatus.

As shown in FIG. 3, the monochrome image correction processing unit 140 comprises a scanner γ processing unit 141, monochrome conversion processing unit 142, filter processing unit 143 and output γ processing unit 144, scanner γ processing, monochrome conversion processing, filter processing and output γ processing being initially performed on the input image prior to output of gray-scale image data. Scanner γ processing is performed by the scanner γ processing unit 141 of the monochrome image correction processing unit 140 prior to the monochrome conversion being performed. Here, luminance is deduced from the RGB signal using a calculation formula. The filter processing unit 143 for performing filter processing comprises a space filter of a 5×5 matrix size. The output γ processing unit 144 is configured from an LUT. The contents of the LUT are converted to alter the density of the read image on the basis of a user's command for altering the density of the read image.

Figure 4:
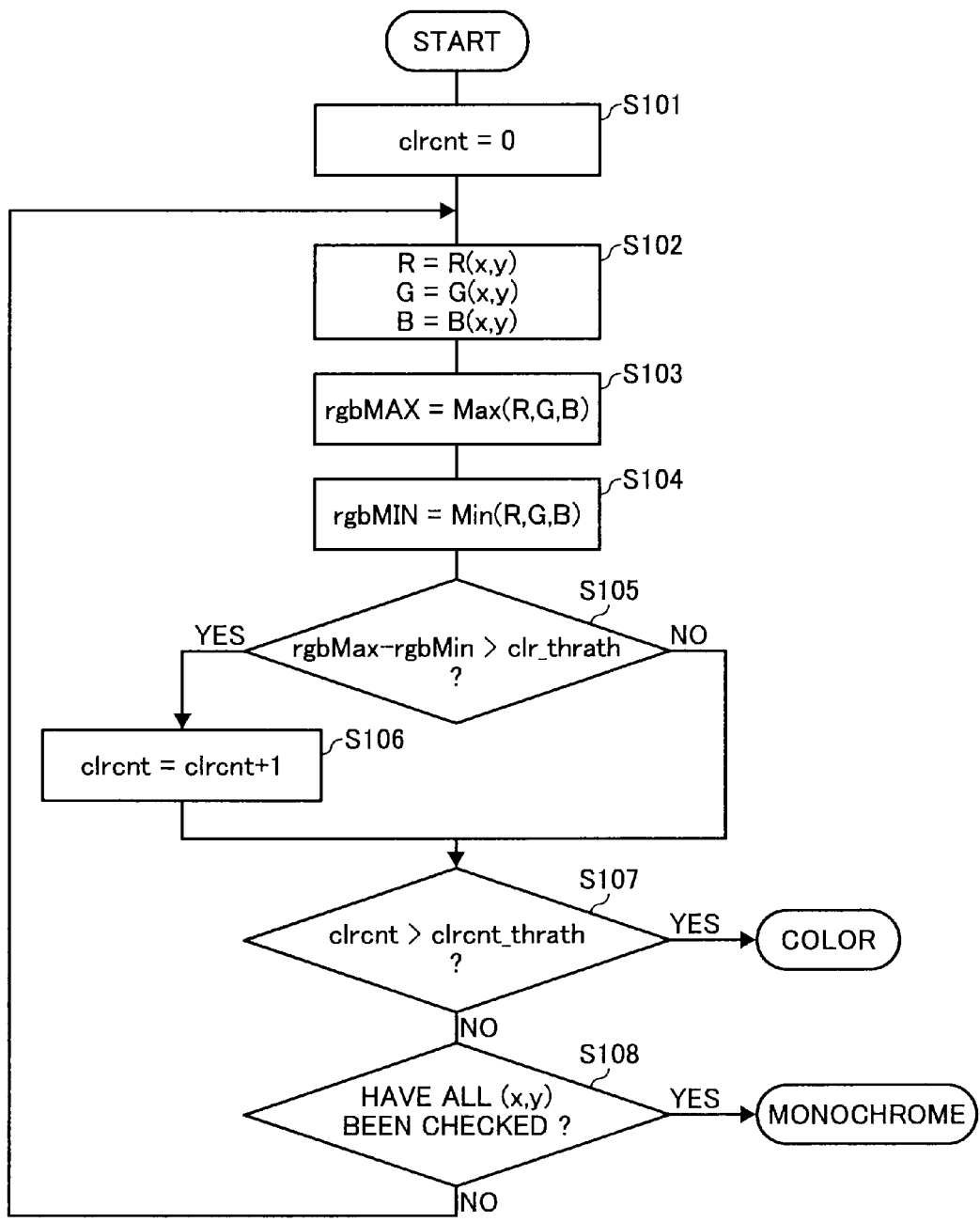
FIG. 4 is a flow chart of the processing routine used to judge whether the original is color or monochrome.

Simultaneously with the color image correction processing and the monochrome image correction processing performed on the RGB data output from the image reading device 110, a judgment of whether the original is color or monochrome is performed by the color/monochrome judging device 120 in the image processing apparatus 100. FIG. 4 is a flow chart for showing the processing routine used to judge whether the original is color or monochrome.

To begin with in the processing routine, a counter is reset (Step S101), and RGB data of pixels in the xy plane are then obtained (Step S102). Next, each of the maximum value and minimum value of the input RGB pixels is found (Steps S103, 104) and, furthermore, the difference between the R, G, B data with respect to the input RGB pixels is found and the value thereof compared with a threshold value clr_threth (Step S105). If the value is at least the threshold value clr_threth it is assumed to be a color pixel. The number of color pixels is calculated across the whole of the image (Step S106) and, if the total number of color pixels is at least the threshold value clrcnt_threth (Step S107-Y), the subject image is deemed to be a color image. On the other hand, if the number of color pixels is smaller than this value (Step S108), the subject image is deemed to be a monochrome image.

The color image data processed by the color image correction processing unit 130 and the monochrome image data processed by the monochrome image correction processing unit 140 is accumulated in the image accumulation device 160 by way of the accumulation control device 150. Following the accumulation of (data) for the whole of an image, the result of the color/monochrome judging device 120 is relayed to the accumulation control device 150. This result is accumulated in the image accumulation device 160 correlatively with the image data. When the color/monochrome judgment result is color the accumulated color image data is read from the image accumulation device 160 by the accumulation control device 150 and compressed to a JPEG or similar by the multivalue image compression device 170 and transmitted via the network I/F 180. When the color/monochrome judgment result is monochrome the accumulated monochrome image data is similarly compressed into a JPEG or similar by the multivalue image compression device 170 and transmitted via the network I/F 180.

Based on the adoption of this configuration, because the color image correction processed image data and the monochrome image correction processed image data are accumulated in the image accumulation device 160 and the result judged by the color/monochrome judging device 120 is correlatively accumulated with the color or monochrome image, the need for transmission to an external network following the accumulation of the image data and subsequent to the processing being performed is eliminated. Accordingly, images can be read and instantaneously transmitted.

According to the first embodiment as described above, because color scanner image data and monochrome scanner image data on which processings have been performed in advance are accumulated, once the color/monochrome judgment is completed the image data can be immediately transmitted.

Second Embodiment

Figure 5:
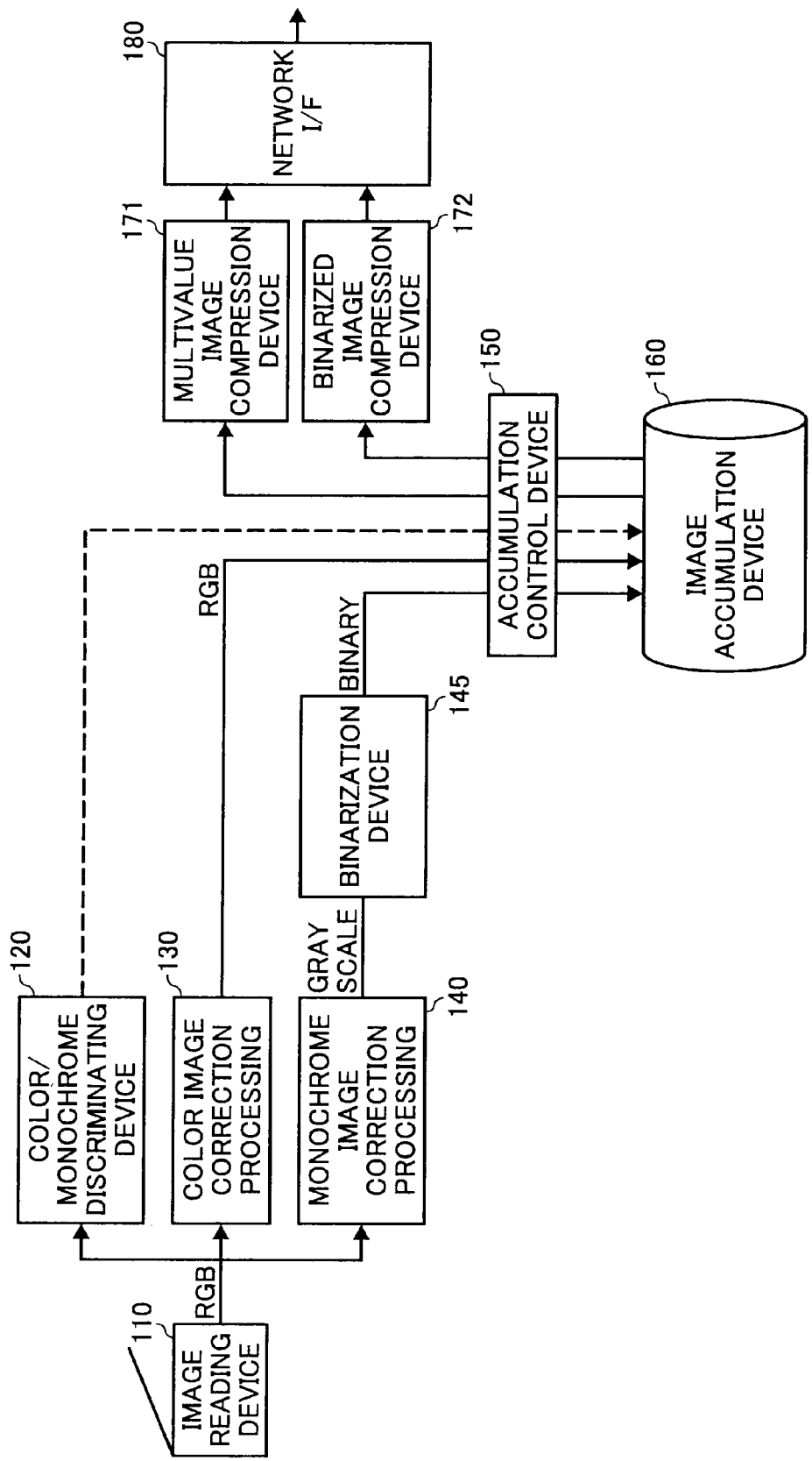
FIG. 5 is a block diagram of the configuration of an image processing apparatus pertaining to a second embodiment of the present invention.

FIG. 5 is a block diagram of the configuration of an image processing apparatus pertaining to this embodiment. Notably, identical reference symbols have been assigned to components identical to those of the first embodiment and, accordingly, a repetition of the description thereof has been omitted.

In this embodiment a binarization device 145 for performing binarization of the monochrome images is further provided in the first embodiment described above. Accordingly, monochrome image correction processed gray-scale data is converted into binary data by the binarization device 145. When the color/monochrome judgment result is color, the accumulated color image data is read from the image accumulation device 160 by the accumulation control device 150 and compressed into a JPEG or similar by a multivalue image compression device 171 and transmitted via the network I/F 180. On the other hand, when the color/monochrome judgment result is monochrome, the accumulated monochrome binarized image data is read from the image accumulation device 160 by the accumulation control device 150 and compressed into an MHMR format or similar by a binarized image compression device 172 and transmitted via the network I/F 180.

The remaining components for which there is no special description provided are configured identically to and function in the same way as those of the first embodiment described above.

Based on the adoption of this configuration, in the same way as the first embodiment described above, the need for transmission to an external network following accumulation subsequent to the processings being performed is eliminated, and images can be read and instantaneously transmitted. For a monochrome judgment in particular, because binary data is produced and compression suitable for a binary format is performed, the quantity of transmitted data can be reduced.

According to the second embodiment as described above, because gray-scale images and monochrome scanner binary images on which processings have been performed in advance are accumulated, once the color/monochrome judgment is completed the image data can be instantaneously transmitted.

Third Embodiment

Figure 6:
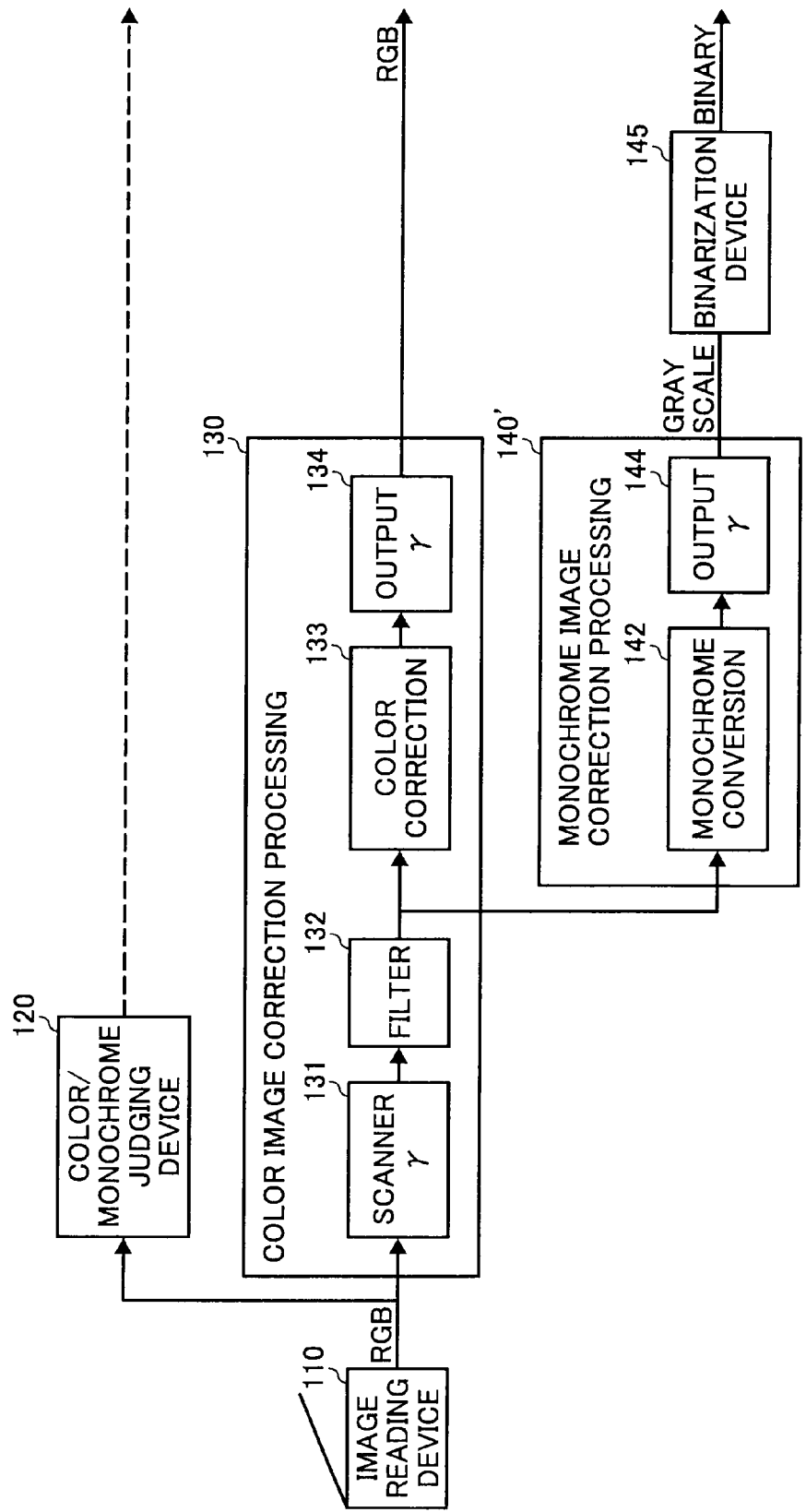
FIG. 6 is a block diagram of the configuration of an image processing apparatus pertaining to a third embodiment of the present invention.

FIG. 6 is a block diagram of the configuration of an image processing apparatus pertaining to this embodiment. Notably, identical reference symbols have been assigned to components identical to the first and second embodiments and, accordingly, a repetition of the description thereof has been omitted.

In this embodiment a processing of the monochrome image correction processing unit 140 and a processing of the color image correction processing unit 130 are partially shared, the scanner γ processing unit 141 and monochrome conversion processing unit 142 of the monochrome image correction processing unit 140 of FIG. 3 and the scanner γ processing unit 131 and filter processing unit 132 of the color image correction processing unit 130 of FIG. 2 being used. Accordingly, a monochrome image processing unit 140' of this embodiment is configured from the monochrome conversion processing unit 142 and the output γ processing unit 144, the binarization device 145 of the second embodiment being connected in a subsequent stage. The remaining components are configured identically to the previously described second embodiment.

By the adoption of this configuration, the image data read by the image reader device 110 is scanner γ processed and filter processed by the scanner γ processing unit 131 and filter processing unit 132 respectively. The processing performed to this point is the same for color and monochrome. Thereafter, in a processing flow assuming the use of a color original, RGB image data is sent to the accumulation control device 150 by way of the color correction processing unit 133 and output γ processing unit 134. Simultaneously, the output filter processed by the filter processing unit 132 is converted into a gray-scale image signal (image data) by way of the monochrome conversion processing unit 142, and binary data is created by way of the output γ processing unit 144 and binarization device 145. RGB multivalue data and monochrome binary data are sent together by the accumulation control device and accumulated in the image accumulation device 160.

Irrespective of the color/monochrome judgment, in the image processing apparatus of the third embodiment the scanner γ processing unit 131 and filter processing unit 132 perform the same processing. In addition, the color output γ and monochrome output γ of the output γ processing units 134, 144 are altered according to the respective image densities. For example, if the user designates a character/photo mode density 4, a filter of frequency characteristics suitable for the character/photo mode is employed. The filter employed affords color output γ correspondent to a density 4. The filter employed also affords monochrome output γ correspondent to a density 4. Using this kind of mechanism, if a character/photo mode density 4 is designated by the user in advance, an image of character/photo density 4 will be produced irrespective of the color/monochrome judgment. This implies a conformance of the images when color/monochrome explicitly designated by the user and, accordingly, the maintaining of image consistency when an automatic judgment is made.

The remaining components for which there is no special description provided are configured identically to and function in the same way as those of the first and second embodiments described above.

Based on the adoption of this configuration, because the image quality mode selected during the automated color/monochrome discrimination mode is either conformant or related in terms of being monochrome or color, irrespective of the color/monochrome judgment of the original, conformance with the mode selected by the user is possible.

In each of the first to third embodiments as described above, a color image or monochrome image judgment is made by the color/monochrome judging device 120. In the flow chart shown in FIG. 4, degrees of color/monochrome judgment are determined on the basis of two threshold values clr_threth and clrcnt_threth. The smaller the threshold values clr_threth and clrcnt_threth the more likely it is that a color image judgment will be made.

Here, there is considered to be a difference in the target original between when the user explicitly indicates a character mode for actuating an ACS mode (automated color/monochrome discrimination mode) and when the user indicates a photo mode to actuate the ACS mode. If the character mode is indicated, the character-based office originals are presumed to be essentially all monochrome and, for color originals as well, it is anticipated that the majority of the originals are likely to be judged as color because of their brightness and high color saturation. Conversely, when the photo mode is indicated, it is anticipated that the subject comprises mainly full picture color images. Based on this, in practical application a monochrome judgment is considered likely to be made using the ACS character mode and a color judgment is considered likely to be made using the ACS photo mode. Accordingly, the color judgment threshold value is altered in response to the character, character/photo and photo image quality modes as shown in FIG. 7. By altering the color judgment threshold values in this way, the color judgment can be accurately implemented in accordance with the mode. Apart from the color judgment of image quality modes, the idea of altering the judgment threshold values in this way can also have application in, for example, the setting of density notches.

According to the judgment method described above, because the color/monochrome judgment threshold values are altered in accordance with the image quality mode selected by the user in this way, in its actual application the occurrence of erroneous judgments can be suppressed to a minimum.

Figure 8:
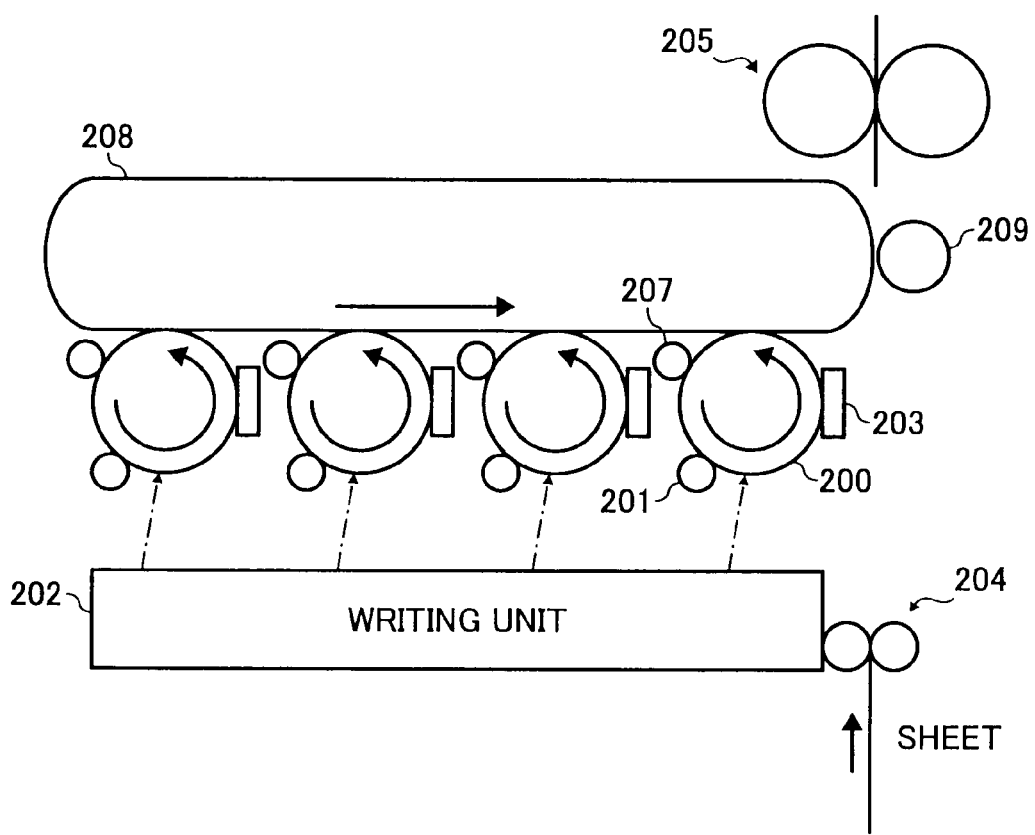
FIG. 8 is a diagram showing one example of the general configuration of an imaging unit of an image forming apparatus for forming images based on image data processed by the image processing apparatuses pertaining to the first to third embodiments.

While in the first to third embodiments described above color image data or monochrome binary image data read from the image accumulation device 160 is compressed and output to the network I/F 180, when this data is output to the imaging unit side of an image forming apparatus as shown in FIG. 8, image forming is performed by the image forming apparatus. In the imaging unit the compressed data is expanded by the control unit and converted to optical write data, and optical writing is performed for each color Y, C, M, K to form an image. The imaging unit is fundamentally configured from a photosensitive body 200, charging unit 201, writer unit 202, developer unit 203, primary transfer unit not shown in the diagram, cleaning unit 207, intermediate transfer belt 208, secondary transfer unit 209, paper supply unit 204, fixing unit 205 and control unit comprising a CPU not shown in the diagram. The writer unit 202 comprises, for each of YMCK colors, four known optical writer devices that use a semiconductor laser (LD), a polygon mirror and another write optical system, an performs an optical writing of each color. A single color, using the K color in the diagram as an example, will be hereinafter described.

In the forming of an image, the photosensitive body 200 is charged by the charging unit 201, and an LD light modulated in accordance with the image data is irradiated from the writer unit 202 onto the photosensitive body 200 forming an electrostatic latent image on the surface of the photosensitive body 200. The electrostatic image on the photosensitive body 200 is developed as an image in the developer unit 203 as a result of the affixing a toner of a color correspondent to the photosensitive body 200, and the developed toner image is then primary transferred to the intermediate transfer belt 208. In this embodiment a full color image is formed by the transfer and superposing of toner images onto the intermediate transfer belt 208 in the order Y, C, M, K. Meanwhile, transfer paper is supplied from the supply paper unit 204 and, in the secondary transfer unit 209, the full color image is secondary transferred from the intermediate transfer belt 208 onto the transfer paper. The color image transferred onto the transfer paper is fixed by a next-stage fixing unit 205. In addition, the residual toner image remaining on the surface of the photosensitive body 200 is removed by the cleaning unit 207. Notably, for a monochrome image, the process is performed using the K color only.

According to the present invention described above, because color image data and monochrome gray-scale image data on which processing has been performed is accumulated in accumulation means in advance, once a color/monochrome judgment has been completed the image data can be instantaneously transmitted.

Various modifications will become possible for those skilled in the art after receiving the teachings of the present disclosure without departing from the scope thereof.

What is claimed is:

1. An image processing apparatus comprising:
 color image correction processing means for performing color image correction processing on input RGB image data to output color image data;
 monochrome image conversion processing means for performing monochrome image conversion processing on the RGB image data to convert the RGB image data to monochrome gray-scale image data;
 judging means for judging, while the color image correction processing means performs color image correction processing and the monochrome image conversion processing means performs monochrome image conversion processing, whether the input RGB image data is color or monochrome to produce a judgment result based on a color difference threshold and a number of pixels threshold;

accumulation means for accumulating the color image data and the monochrome gray-scale image data and for accumulating the judgment result correlatively with the accumulated color and monochrome gray-scale image data a network interface means for transmitting data accumulated in the accumulation means to an external network; and control means for outputting either the color image data or the monochrome gray-scale image data accumulated in the accumulation means to an external network in accordance with the judgment result;

wherein a threshold value, used by the judging means to judge whether the input RGB data is color or monochrome, is switched by the judging means in accordance with a selected image quality mode.

2. The image processing apparatus as claimed in claim 1, wherein the RGB image data constitutes data input from image reading means for reading image data to obtain RGB image data.

3. The image processing apparatus as claimed in claim 1, wherein identical RGB image data is simultaneously input in the color image correction processing means and the monochrome image conversion processing means.

4. The image processing apparatus as claimed in claim 1, further comprising binarization means for binarizing the monochrome gray-scale image data.

5. The image processing apparatus as claimed in claim 4, wherein the accumulation means accumulates the monochrome gray-scale image data binarized by the binarization means.

6. The image processing apparatus as claimed in claim 1, wherein a portion of processing elements of the color image correction processing means and a portion of processing elements of the monochrome image conversion processing means are partially used in common.

7. The image processing apparatus as claimed in claim 6, wherein the portions of processing elements partially used in common constitute scanner γ processing and filter processing provided in a pre-stage of a color correction processing unit of the color image correction processing means.

8. An image forming apparatus comprising an image processing apparatus, the image processing apparatus comprising:

a color image correction processing unit configured to perform color image correction processing on the RGB image data to output color image data;

a monochrome image conversion processing unit configured to perform monochrome image conversion processing on the RGB image data to convert the RGB image data to monochrome gray-scale image data;

a judging device configured to judge, while the color image correction processing unit performs color image correction processing and the monochrome image conversion processing unit performs monochrome image conversion processing, whether the input RGB image data is color or monochrome to produce a judgment result based on a color difference threshold and a number of pixels threshold;

an accumulation device configured to accumulate the color image data and the monochrome gray-scale image data and to accumulate the judgment result correlatively with the accumulated color and monochrome gray-scale image data;

a network interface configured to transmit data accumulated in the accumulation device to an external network; and a controller configured to output either the color image data or the monochrome gray-scale image data accumulated in the accumulation device to an external network in accordance with the judgment result of the judging device;

wherein a threshold value, used by the judging device to judge whether the input RGB data is color or monochrome, is switched by the judging device in accordance with a selected image quality mode.

9. An image processing apparatus comprising:

a color image correction processing unit configured to perform color image correction processing on the RGB image data to output color image data;

a monochrome image conversion processing unit configured to perform monochrome image conversion processing on the RGB image data to convert the RGB image data to monochrome gray-scale image data;

a judging device configured to judge, while the color image correction processing unit performs color image correction processing and the monochrome image conversion processing unit performs monochrome image conversion processing, whether the input RGB image data is color or monochrome to produce a judgment result based on a color difference threshold and a number of pixels threshold;

an accumulation device configured to accumulate the color image data, the monochrome gray-scale image data, and the judgment result;

a network interface configured to transmit data accumulated in the accumulation device to an external network; and a controller configured to output either the color image data or the monochrome gray-scale image data accumulated in the accumulation device to an external network in accordance with the judgment result of the judging device;

wherein a threshold value, used by the judging device to judge whether the input RGB data is color or monochrome, is switched by the judging device in accordance with a selected image quality mode.

10. The image processing apparatus as claimed in claim 9, wherein the RGB image data constitutes data input from an image reading device that reads image data to obtain RGB image data.

11. The image processing apparatus as claimed in claim 9, wherein identical RGB image data is simultaneously input in the color image correction processing device and the monochrome image conversion processing device.

12. The image processing apparatus as claimed in claim 9, further comprising a binarization device that binarizes the monochrome gray-scale image data.

13. The image processing apparatus as claimed in claim 12, wherein the accumulation device accumulates the monochrome gray-scale image binarized by the binarization device.

14. The image processing apparatus as claimed in claim 9, wherein a portion of processing elements of the color image correction processing device and a portion of processing elements of the monochrome image conversion processing device are partially used in common.

15. The image processing apparatus as claimed in claim 14, wherein the portions of processing elements partially used in common constitute scanner γ processing and filter processing provided in a pre-stage of a color correction processing unit of the color image correction processing device.

16. The image processing apparatus as claimed in claim 1, wherein the judging means further includes
- means for determining maximum and minimum values of RGB pixels of the input RGB image data,
- means for determining a difference between the maximum and minimum values of each of the RGB pixels,
- means for comparing the differences between the maximum and minimum values of each of the RGB pixels with the color difference threshold to determine if each of the RGB pixels is a color pixel; and
- means for determining if the RGB image data is a color image based on whether a number of the RGB pixels determined to be color pixels is greater than the number of pixels threshold.

* * * * *